(12) United States Patent
Hikmet et al.

(10) Patent No.: US 11,460,624 B2
(45) Date of Patent: Oct. 4, 2022

(54) LIGHT GUIDE COMPRISING A LOCAL LIGHT OUT COUPLING PORTION AND A METHOD FOR INTRODUCING THE SAME

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 25 days.

(21) Appl. No.: 16/621,130

(22) PCT Filed: Jun. 4, 2018

(86) PCT No.: PCT/EP2018/064629
§ 371 (c)(1),
(2) Date: Dec. 10, 2019

(87) PCT Pub. No.: WO2018/228843
PCT Pub. Date: Dec. 20, 2018

(65) Prior Publication Data
US 2021/0141143 A1    May 13, 2021

(30) Foreign Application Priority Data
Jun. 12, 2017 (EP) .................................... 17175433

(51) Int. Cl.
*F21V 8/00* (2006.01)
(52) U.S. Cl.
CPC .......... *G02B 6/0041* (2013.01); *G02B 6/001* (2013.01); *G02B 6/0006* (2013.01); *G02B 6/0065* (2013.01)

(58) Field of Classification Search
CPC .. G02B 6/0041; G02B 6/0006; G02B 6/0065; G02B 6/001
See application file for complete search history.

(56) References Cited

U.S. PATENT DOCUMENTS

| | | | |
|---|---|---|---|
| 6,555,288 B1 | 4/2003 | Xu et al. | |
| 2003/0156426 A1 | 8/2003 | Givoletti | |
| 2009/0210038 A1 | 8/2009 | Neuberger et al. | |
| 2011/0109839 A1* | 5/2011 | Zhu | G02F 1/133606 349/62 |
| 2011/0212411 A1* | 9/2011 | Sinofsky | G02B 6/001 264/1.27 |

(Continued)

FOREIGN PATENT DOCUMENTS

| | | |
|---|---|---|
| CN | 101946197 A | 1/2011 |
| EP | 2318835 A2 | 5/2011 |

(Continued)

*Primary Examiner* — Donald L Raleigh
(74) *Attorney, Agent, or Firm* — Daniel J. Piotrowski

(57) ABSTRACT

A light guide (1) is presented. The light guide (1) comprises a body (2) made of a transparent polymer with nanoparticles (3) arranged therein, said body (2) comprising at least one locally deformed section (4) forming a local light out-coupling portion (6) of the light guide (1), wherein the local light out-coupling portion (6) comprises crazes (5) at, or in vicinity of, at least a portion of the nanoparticles (3) arranged in the at least one portion of the light guide (1), the crazes (5) are acting as light scatterers. Also a method for introducing a local light out-coupling portion (6) in a light guide (1) is presented.

17 Claims, 4 Drawing Sheets

(56) References Cited

U.S. PATENT DOCUMENTS

| | | |
|---|---|---|
| 2011/0277361 A1 | 11/2011 | Nichol et al. |
| 2012/0236298 A1 | 9/2012 | Stuke et al. |
| 2013/0088888 A1 | 1/2013 | Scott et al. |
| 2014/0140091 A1* | 5/2014 | Vasylyev .............. G02B 6/0085 362/606 |
| 2014/0152789 A1 | 6/2014 | Hu et al. |
| 2014/0218958 A1* | 8/2014 | Fewkes .............. G02B 6/02357 362/558 |
| 2015/0131306 A1 | 5/2015 | Genier et al. |
| 2016/0293893 A1* | 10/2016 | Shikauchi ........... H01L 51/5268 |

FOREIGN PATENT DOCUMENTS

| | | | |
|---|---|---|---|
| WO | 2010011299 A2 | 1/2010 | |
| WO | 2016064940 A1 | 4/2016 | |
| WO | 2017087771 A1 | 5/2017 | |
| WO | WO-2017087771 A1 * | 5/2017 | ........... G02B 6/0003 |

* cited by examiner

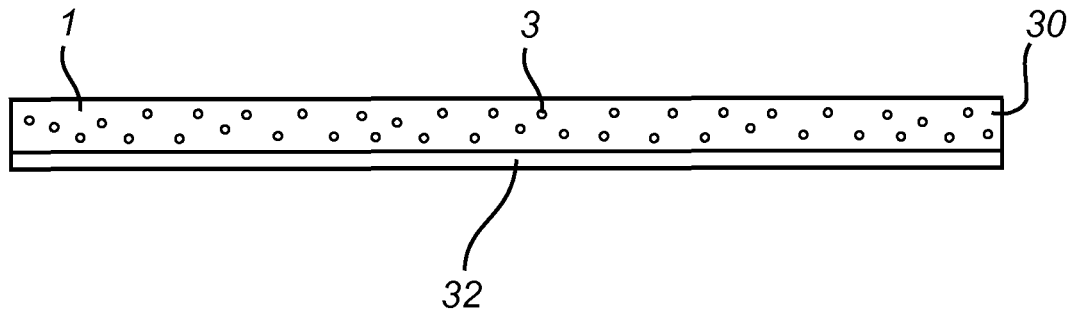
*Fig. 3*
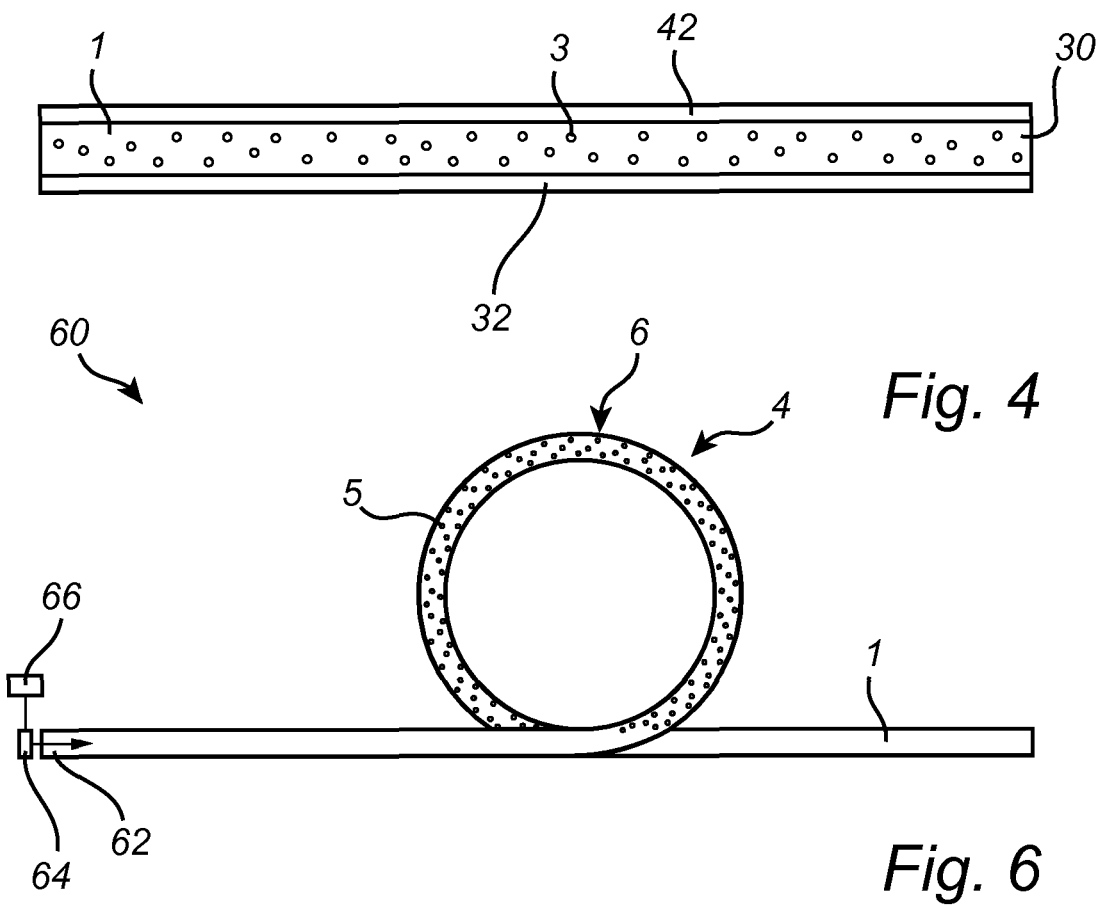
*Fig. 4*
*Fig. 6*

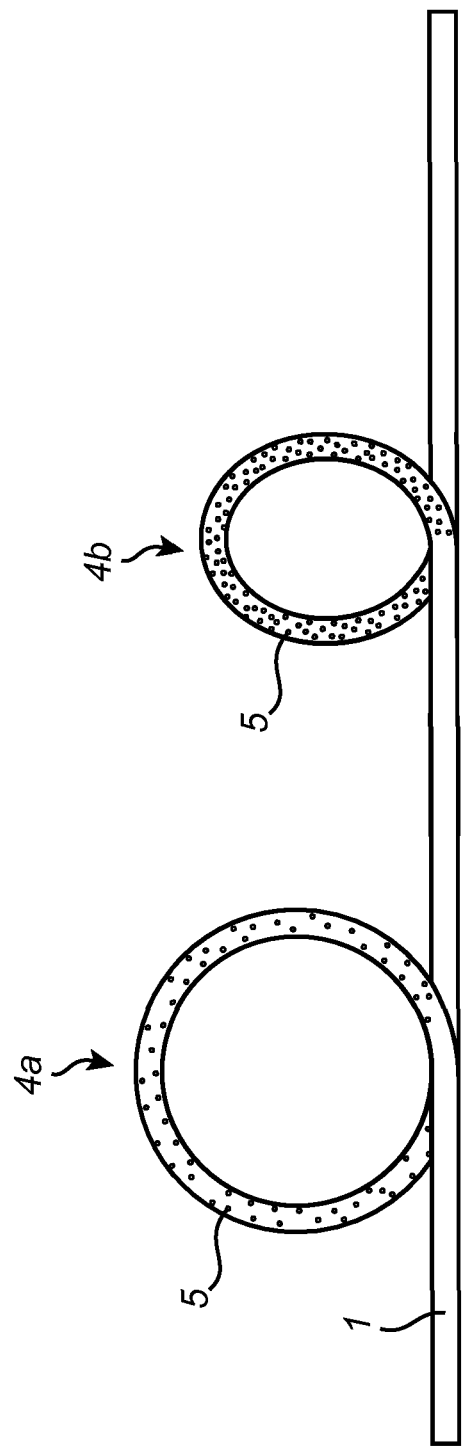

LIGHT GUIDE COMPRISING A LOCAL LIGHT OUT COUPLING PORTION AND A METHOD FOR INTRODUCING THE SAME

CROSS-REFERENCE TO PRIOR APPLICATIONS

This application is the U.S. National Phase application under 35 U.S.C. § 371 of International Application No. PCT/EP2018/064629, filed on Jun. 4, 2018, which claims the benefit of European Patent Application No. 17175433.6, filed on Jun. 12, 2017. These applications are hereby incorporated by reference herein.

FIELD OF THE INVENTION

The invention relates to a light guide comprising a local light out-coupling portion. The invention also relates to a method for introducing a local light out-coupling portion to a light guide.

BACKGROUND OF THE INVENTION

Incandescent lamps are being rapidly replaced by LED based lighting solutions. It is nevertheless appreciated by the user to have retrofit lamps which have the looks of an incandescent bulb. For this purpose, one can simply make use of the infrastructure for producing incandescent lamps based on glass and replace the filament with LEDs emitting white light. One of the concepts for replacing the filament with LEDs is based on LED filaments placed in a bulb. Another possibility is to use an optical fiber which may be shaped in various designs for decorative purposes. One or more LEDs are used for coupling light into the optical fiber. The optical fiber further contains light out-coupling means such as light scattering particles. The appearance of the replaced filament in the form of the optical fiber depend on the LEDs used for coupling light into the optical fiber and the design of the optical fiber itself. For example, the placement and density of the light out-coupling means within the optical fiber influence the appearance of a light bulb comprising the optical fiber as a "filament".

SUMMARY OF THE INVENTION

It is an object of the present invention to provide increased options for designing an optical fiber used as a "filament" in a light bulb.

According to a first aspect, a light guide is provided. The light guide comprises a body made of a transparent polymer with nanoparticles arranged therein. The body comprises at least one locally deformed section forming a local light out-coupling portion of the light guide. The local light out-coupling portion comprises crazes at, or in vicinity of, at least a portion of the nanoparticles arranged in the at least one portion of the light guide. The crazes are acting as light scatterers.

This provides increased options for designing a light guide used as a "filament" in a light bulb. This since the light guide may be deformed in accordance with design considerations. Local light out-coupling portions may be created in accordance with design considerations. The creation of the local light out-coupling portions is easily achieved since the light guide only need to be deformed at the section of the light guide where a local light out-coupling portion fits the design. The deformation may be achieved by applying any kind of deformation force, such as bending, stretching, twisting or compression. Further, the at sections of the light guide where no deformation is induced the light guide remains transparent and just guides the light through the section.

The body may comprise a first locally deformed section and a second locally deformed section, wherein a density of crazes in the first locally deformed section is different from a density of crazes in the second locally deformed section. This may be achieved by applying different degree of deforming force to the first and second locally deformed sections. Hence, the locally deformed section of the light guide being deformed the most will have a higher density of crazes.

The first and second locally deformed sections may be separated by a locally un-deformed section of the light guide.

The transparent polymer may be chosen from the group consisting of acrylic glass, polystyrene, styrene-acrylic copolymer, polycarbonate and cyclic olefin. All of these polymers are transparent brittle polymers.

The nanoparticles may be made of copolymers of styrene and butadiene. These are readily available nanoparticles. Preferably the size of the nanoparticles is the range of 5-200 nm. The use of nanoparticles with such a size ensure that there is no excess light scattering.

The light guide may be in the form of an optical fiber. Hence, a shape of the light guide that is easy to form in to a classic "filament" is provided.

The light guide may be in the form of a sheet.

The transparent polymer with nanoparticles arranged therein may constitute a first layer of the light guide, wherein the light guide further comprises a second layer made of transparent polymer without nanoparticles arranged therein, wherein the first and second layers are stacked. The obtained effect is that the first surface of the stacked light guide scattering is induced, while at the second surface no scattering is induced. This effect can be used to tune the light out coupling.

The transparent polymer with nanoparticles arranged therein may constitute a core of the light guide, wherein the light guide further comprises a cladding made of transparent polymer without nanoparticles arranged therein. The core and the cladding may have different diffractive index. The obtained effect is that the light in the light guide is transported to the local light out-coupling portions by total internal reflection without light out-coupling e.g. due to local damages or dust on the light guide construction.

The transparent polymer with nanoparticles arranged therein further comprises a phosphor material. The obtained effect is that in the local light out-coupling portions light conversion appears and thus not only light source light is coupled out but also converted light can escape the light guide. Combination of both light gives decorative light effects.

The nanoparticles may be homogeneously arranged in the transparent polymer. This will enhance the design freedom since the density of the nanoparticles is not need to be considered when choosing sections of the light guide to be deformed for forming local light out-coupling portions.

According to a second aspect a lighting device is provided. The lighting device comprises a light guide according to the first aspect and a light source configured to emit light into a light in-coupling portion of the light guide.

The light guide may comprise two or more light in-coupling portions, wherein a respective light source is arranged at each of the two or more light in-coupling portions. The obtained effect may be enhanced decorative effect. The two or more light sources may emit different colors. The obtained effect may be a decorative colored appearance.

The lighting device may comprise a control unit. The control unit controls the one or more light sources. The obtained effect may be dynamic decorative light effects.

The lighting device may be used in a lamp.

The lighting device may be used in a luminaire.

According to third aspect a method for introducing a local light out-coupling portion in a light guide is provided. The method comprises providing a light guide comprising a transparent polymer with nanoparticles arranged therein; and applying a deforming force to at least one portion of the light guide, whereby crazes are induced at, or in vicinity of, at least a portion of the nanoparticles arranged in the at least one portion of the light guide, the crazes are acting as light scatterers forming the local light out-coupling portion in the light guide.

This provide increased options for designing a light guide used as a "filament" in a light bulb. This since the light guide may be deformed in accordance with design considerations. Local light out-coupling portions may be created in accordance with design considerations. The creation of the local light out-coupling portions is easily achieved since the light guide only need to be deformed at the section of the light guide where a local light out-coupling portion fits the design. The deformation may be achieved by applying any kind of deformation force, such as bending, stretching, twisting or compression. Further, at the sections of the light guide where no deformation is induced the light guide remains transparent and just guides the light through the section.

The method may further comprise applying different degree of deforming force along different sub-portions of the at least one portion of a light guide, whereby a degree of crazes induced at, or in vicinity of, at least a portion of the nanoparticles arranged in the at least one portion of the light guide is varied as a result of the degree of applied deforming force. The obtained effect is that the light out-coupling may be tuned. More light may be coupled out a sub-portion where the degree of deforming force is comparatively high as compared with a sub-portion where the degree of deforming force is comparatively low.

The method may further comprise applying the deforming force to a plurality of different portions of the light guide forming a plurality of local light out-coupling portions in the light guide. The obtained effect is that multiple local light out-coupling portions may be provided. The sections of the light guide not being deformed will remain mainly transparent and will mainly only guide light there through. Such effect can be used for decorative light out-coupling.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to the appended drawings showing embodiments of the invention. The figures should not be considered limiting the invention to the specific embodiment; instead they are used for explaining and understanding the invention.

FIG. 3 illustrates a schematic side view of an alternative light guide.

FIG. 4 illustrates a schematic side view of yet an alternative light guide.

FIG. 6 illustrates a schematic side view of a lighting device comprising a light guide having a local light out-coupling portion.

FIG. 7 illustrates a schematic side view of light guide comprising two local light out-coupling portions.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
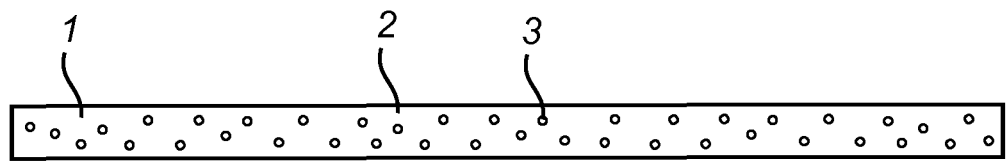
FIG. 1a illustrates a schematic side view of a light guide in an un-deformed state.
Figure 1B:
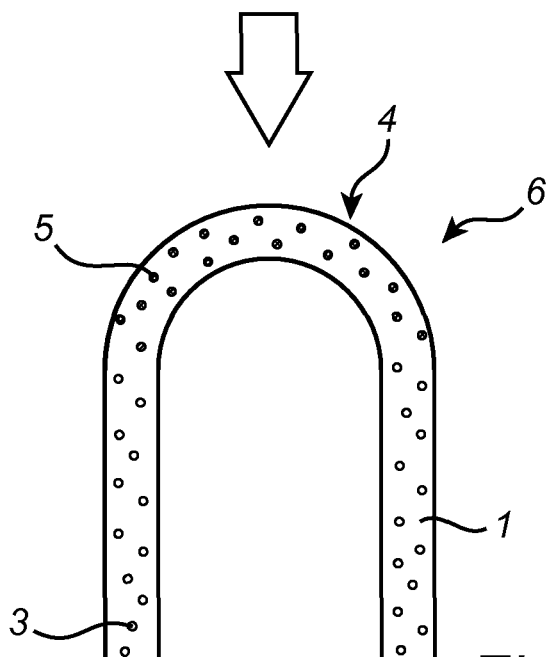
FIG. 1b illustrates a schematic side view of the light guide of FIG. 1a in a deformed state, wherein a local light out-coupling portion is formed.

In connection with FIGS. 1a and 1b a schematic top view of a light guide 1 is shown. The light guide 1 comprises a body 2 comprising one or more layers. At least a first layer of the body 2 is made of transparent polymer. Nanoparticles 3 are arranged in the transparent polymer. The nanoparticles may be homogeneously arranged in the transparent polymer.

The transparent polymer may be chosen from the group consisting of acrylic glass, polystyrene, styrene-acrylic copolymer, polycarbonate and cyclic olefin. All of these polymers are transparent brittle polymers. Charpy impact strength (un-notched) of the transparent polymer, without the nanoparticles arranged therein, is preferably less than 50 kJ/N.

The nanoparticles may be made of copolymers of styrene and butadiene. The nanoparticles are well dispersed particles, preferably smaller than 200 nm, which do not give excess light scattering.

The light guide 1 shown in FIGS. 1a and 1b is in the form of an optical fiber. However, just as will be discussed below, the light guide 1 may have a different form, e.g. in the form of a sheet. The sheet may e.g. be in the form of an elongated surface. The light guide 1 in the form of a sheet will be discussed in more detail below in connection with FIGS. 2a and 2b.

In FIG. 1a the light guide 1 is shown in an un-deformed state. In FIG. 1b the light guide 1 is shown in state wherein a section of the light guide 1 is deformed. The transition between the un-deformed and deformed states are indicated by an arrow. Hence, the light guide 1 comprises a locally deformed section 4. In the in FIG. 1b shown example the light guide 1 is deformed by being bent. Hence, the light guide 1 is deformed be application of a bending force to the light guide 1. The deformation of the light guide may however be made by applying other kind of deformation forces, non-limiting examples are application of a compression force, a stretching force or a twisting force to the light guide 1. At formation of the locally deformed section 4, by application of the deformation force, crazes 5 will be formed at, or in vicinity of, nanoparticles 3 arranged in the locally deformed section 4. In FIG. 1b the formed crazes 5 are indicated by solid dots and the nanoparticles 3 of the locally un-deformed sections of the light guide is shown hollow dots. In FIG. 1b all nanoparticles in the locally deformed section 4 are indicated as being inducing the formation of crazes 5. However, this might not always be true. Some of the nanoparticles 3 in the locally deformed section 4 may not have crazes 5 formed at or in vicinity thereof. Hence, the locally deformed section 4 comprises crazes 5. Light being guided in the light guide and reaching the locally deformed section 4 will be scattered at the crazes 5. Hence, the crazes 5 are acting as light scatterers. Hence, the locally deformed section 4 will act as a local light out-coupling portion 6 of the light guide 1. The light guide 1 may comprise a plurality of locally deformed sections 4. Hence, the light guide 1 may comprise a plurality of local light out-coupling portions 6, this is exemplified in FIGS. 2b and 7. In case of the light guide 1 comprises a plurality of local light out-coupling portions 6, the local light out-coupling portions 6 may be oriented with different orientations in space. Hence, the plurality of local light out-coupling portions 6 may form a pattern, a logo or text.

Upon bending, or in other wise applying a deformation force, of the light guide 1, stress is induced in the light guide 1. The section of the light guide 1 where the stress is tensile, crazes 5 appear and the light guide 1 becomes locally light-scattering, while un-deformed sections of the light guide 1 remains mainly transparent. Such effect may be used for decorative light out-coupling. The light guide 1 may be bent, or in other ways deformed, into the form of a filament.

The light guide 1 forming the filament may be configured in various ways. The light guide 1 may be configured as comprising one or more loops. In case of the light guide comprising a plurality of loops the loops may have different diameter, see e.g. FIG. 7. One or more of the loops may have a circular shape. One or more of the loops may have an oval shape. One or more of the loops may have an increasing pitch. One or more of the loops may have a decreasing pitch. One or more of the loops may have a sharp bend arranged therein.

In connection with FIGS. 1a and 1b a light guide 1 in the form of an optical fiber is illustrated. A length of the optical fiber is preferably in the range from 1 cm to 50 cm. A diameter of the optical fiber is preferably in the range from 0.1 to 5 mm. Preferably, the length of the optical fiber is at least 10 times the diameter of the optical fiber. More preferably, the length of the optical fiber is at least 15 times the diameter of the optical fiber. Most preferably the length of the optical fiber is at least 20 times the diameter of the optical fiber.

Figure 2A:
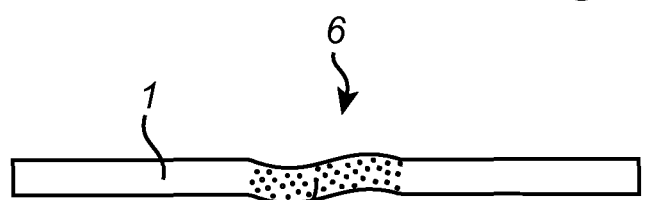
FIG. 2a illustrates a schematic side view of a light guide 1 in the form of a sheet having a local light out-coupling portion.
Figure 2B:
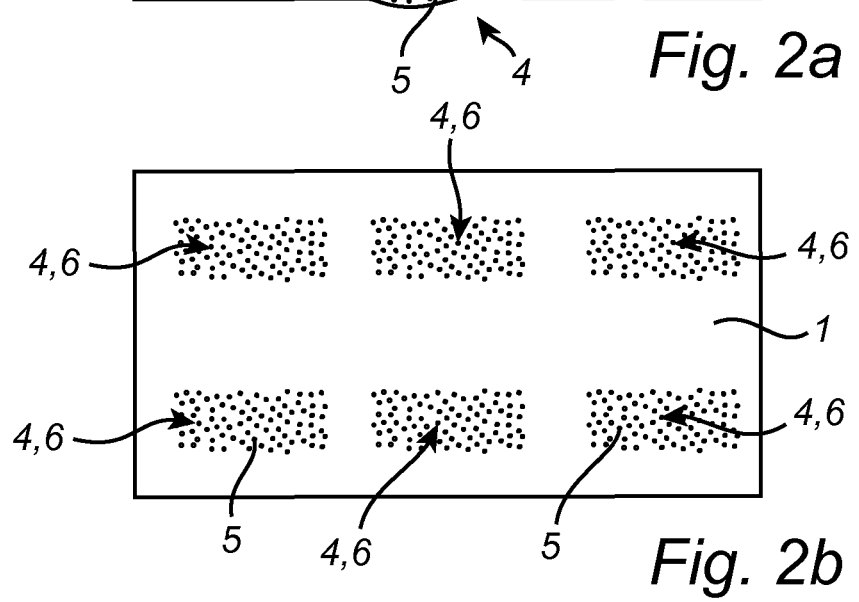
FIG. 2b illustrates a schematic top view of a light guide in the form of a sheet having a plurality of local light out-coupling portions.

As discussed above, the light guide 1 may have other forms. An example of a light guide 1 in the form of a sheet is illustrated in connection with FIGS. 2a and 2b. A length of the sheet is preferably in the range from 1 cm to 100 cm. A height of the sheet is preferably in the range from 0.1 to 5 mm. A width of the sheet is preferably smaller than the length. Preferably, the length of the sheet is at least 10 times the height of the sheet. More preferably, the length of the sheet is at least 15 times the height of the sheet. Most preferably the length of the sheet is at least 20 times the height of the sheet. FIG. 2a is a side view of a light guide 1 in the form of a sheet. FIG. 2b is a top view of a light guide 1 in the form of a sheet. For the light guides in FIGS. 2a and 2b local light out-coupling portions 6 of the light guide 1 is formed by deforming the sheet. Hence, at the local light out-coupling portions 6 the light guide becomes light scattering, while the rest of the light guide 1 remains mainly transparent. Such effect may be used for decorative light out-coupling.

The light guide 1 may, in the un-deformed state, take other forms than an optical fiber or a sheet. For example, the light guide 1 may, in the un-deformed state, take the form of any three-dimensional structure. Local deformation may then be applied to the light guide 1 for forming local light out-coupling portions 6.

The light guide 1 may be made with laser cutting. Alternatively, the light guide may be an assembly of flat light guides forming a three-dimensional structure. Alternatively, or in combination, the light guide may be made by 3D printing.

The light guide 1 may comprise a plurality of stacked layers. This is schematically illustrated in FIG. 3. Hence, the transparent polymer with nanoparticles 3 arranged therein may constitute a first layer 30 of the light guide 1. A second layer 32 of the light guide 1 may comprise a transparent polymer without nanoparticles arranged therein. The transparent polymer of the second layer 32 may be chosen from the group consisting of acrylic glass, polystyrene, styrene-acrylic copolymer, polycarbonate and cyclic olefin. All of these polymers are transparent brittle polymers. Charpy impact strength (un-notched) of the transparent polymer, without the nanoparticles arranged therein, is preferably less than 50 kJ/N. By a light guide 1 comprising the stacked first and second layers 30, 32, light-scattering may be induced at the surface of the first layer 30, while at the surface of the second layer 32 no scattering is induced. Hence, the light out coupling at local out-coupling portions may be tuned. The light guide 1 of FIG. 3 is illustrated in its un-deformed state. It is however contemplated that such a light guide 1 may be locally deformed for forming one or more local light out-coupling portions 6.

Alternatively, the transparent polymer with nanoparticles 3 arranged therein may constitute a core 40 of the light guide 1. The light guide 1 may then further comprise a cladding 42 made of transparent polymer without nanoparticles arranged therein. This is schematically illustrated in FIG. 4. The core 40 and the cladding 42 may have different diffractive index.

For example, the core 40 and cladding 42 may have different diffractive index such that total internal reflection can be used for wave guiding the light within the light guide 1. Hence, light in the light guide 1 may be transported to local light out-coupling portions 6 by total internal reflection without light out-coupling in the rest of the light guide 1. Accordingly, the cladding 42 provide for that local damages or dust on the light guide 1 does not induce light out-coupling. The light guide 1 of FIG. 4 is illustrated in its un-deformed state. It is however contemplated that such a light guide 1 may be locally deformed for forming one or more local light out-coupling portions 6.

Figure 5:
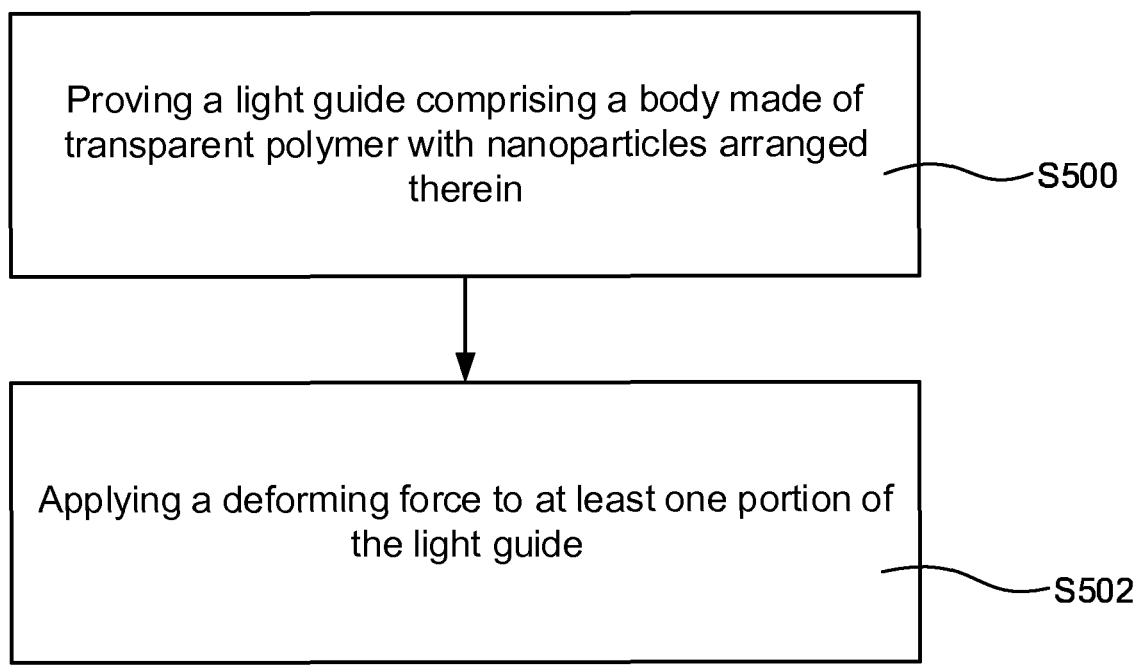
FIG. 5 is a block diagram for a method for introducing a local light out-coupling portion in a light guide.

In connection with FIG. 5 a method for introducing the local light out-coupling portion in the light guide 1 will be discussed. The method comprising the following acts. Providing a light guide 1 according to any of the embodiments disclosed herein S500. Hence, the provided light guide comprises a body made of transparent polymer with nanoparticles 3 arranged therein. The provided light guide 1 further comprises an un-deformed section that is to be deformed for forming a local light out-coupling portion 6. The whole of the provided light guide 1 may be in an un-deformed state. Next the act of applying a deforming force to at least one portion of the light guide S502 is performed. The deforming force may be any force inducing tensile stress in the light guide. Examples of the deforming force are bending, compression, stretching and twisting. By application of the deforming force crazes are induced at, or in vicinity of, at least a portion of the nanoparticles arranged in the at least one portion of the light guide. The crazes are acting as light scatterers forming the local light out-coupling portion in the light guide.

The method may further comprise applying different degree of deforming force along different sub-portions of the at least one portion of a light guide. By this a degree of crazes induced at, or in vicinity of, at least a portion of the nanoparticles arranged in the at least one portion of the light guide is varied as a result of the degree of applied deforming force. For example, a gradual increase and subsequently decrease in deforming force, e.g. by bending, may be applied to the light guide 1. This will result in a gradual increase and then decrease in crazes 5 appearing along the length of the light guide 1 at a locally deformed section 4 thereof.

The method may further comprise applying the deforming force to a plurality of different portions of the light guide forming a plurality of local light out-coupling portions in the light guide. This is illustrated in connection with FIGS. 2*b* and 7.

In connection with FIG. 6 a lighting device 60 comprising a light guide 1 as disclosed herein will be discussed. In addition to what has been discussed above the light guide 1 further comprises a light in-coupling portion 62. The light in-coupling portion 62 of the light guide 1 is preferably located at a locally un-deformed section of the light guide 1. By this improved light in-coupling may be gained.

The lighting device 60 further comprises a light source 64. The light source 64 may be a solid state light source. The light source 64 may be a LED or a laser diode. The light source 64 is arranged such that light emitted from the light source 64 is coupled in at the light in-coupling portion 62 of the light guide 1. This is illustrated with the arrow coming out from the light source 64 and entering the light guide 1 at the light in-coupling portion 62 thereof. The lighting device 60 may further comprise a control unit 66 configured to control the light source 64. The lighting device may further comprise a heat sink (not shown) configured to remove heat from the light source 64.

The light guide 1 may comprise more than one light in-coupling portion. Hence, the light guide 1 may comprise two or more light in-coupling portions. A respective light source may be arranged at each of the two or more light in-coupling portions. The control unit may be configured to control the respective light sources of the lighting device.

The lighting device may be used in a luminaire.

The person skilled in the art realizes that the present invention by no means is limited to the preferred embodiments described above. On the contrary, many modifications and variations are possible within the scope of the appended claims.

For example, the transparent polymer with nanoparticles 3 arranged therein may further comprise a phosphor material. The phosphor material may e.g. be organic phosphor. By this light conversion may be induced at local light out-coupling portions 6. Hence, tuning of the color of the light emitted from the light guide 1 may made.

Moreover, as illustrated in FIG. 7, the light guide may comprise at least three locally un-deformed sections with no crazes and at least two locally deformed sections 4*a*, 4*b* with crazes. The different sections are arranged in an alternating order. A density of crazes 5 in the first locally deformed section 4*a* may be different from a density of crazes in the second locally deformed section 4*b*. The density of crazes 5 may be influenced by means of applying different amount of deforming force to the different locally deformed sections. In FIG. 7 this is illustrated by that at the second locally deformed section 4*b* a higher degree of deformation force has been applied as compared with the deformation force applied at the first locally deformed section 4*a*. This under the assumption that the density of nanoparticles 3 is homogeneous throughout the light guide.

Upon using the light guide 1 of FIG. 7 in a lighting device similar to the one of FIG. 6, a light in-coupling portion thereof at a first of the locally un-deformed sections comprising an in-coupling portion and constitutes the first in the order of local sections of the light guide 1, thereafter the first locally deformed section 4*a* follows followed by yet another locally un-deformed section, and thereafter the second locally deformed section 4*b* follows followed by yet another locally un-deformed section.

Further, the lighting device may comprise one light source configured to emit light of a first color and a second light source configured to emit light of a second color. The light guide may have two (or more) light in-coupling portions, at least one for each light source. The light guide may also comprise two or more local light out-coupling portions.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light guide comprising:
    a body made of a transparent polymer with nanoparticles arranged therein, said body comprising at least one portion being locally deformed whereby crazes are induced so creating a locally deformed section forming a local light out-coupling portion of the light guide, said body further comprising sections where no deformations are induced where the light guide remains transparent and just guides the light through these sections,
wherein the local light out-coupling portion comprises crazes at, or in vicinity of, at least a portion of the nanoparticles arranged in the at least one portion of the light guide, the crazes are acting as light scatterers and,
wherein said nanoparticles have a size in a range of 5-200 nm ensuring that there is no excess light scattering and,
wherein the light out-coupling is tuned based on a number of crazes induced by a degree the at least one portion is locally deformed.

2. The light guide according to claim 1, wherein the body may comprise a first locally deformed section and a second locally deformed section, wherein a density of crazes in the first locally deformed section is different from a density of crazes in the second locally deformed section.

3. The light guide according to claim 2 wherein the first and second locally deformed sections are separated by a locally un-deformed section of the light guide.

4. The light guide according to claim 1, wherein the transparent polymer is chosen from the group consisting of acrylic glass, polystyrene, styrene-acrylic copolymer polycarbonate and cyclic olefin.

5. The light guide according to claim 1, wherein the nanoparticles are made of copolymers of styrene and butadiene.

6. The light guide according to claim 1, wherein the light guide is in the form of an optical fiber.

7. The light guide according to claim 1, wherein the light guide is in the form of a sheet.

8. The light guide according to claim 1, wherein the transparent polymer with nanoparticles arranged therein constitutes a first layer of the light guide, wherein the light guide further comprises a second layer made of transparent polymer without nanoparticles arranged therein, wherein the first and second layers are stacked.

9. The light guide according to claim 1, wherein the transparent polymer with nanoparticles arranged therein constitutes a core of the light guide, wherein the light guide further comprises a cladding made of transparent polymer without nanoparticles arranged therein.

10. The light guide according to claim 9, wherein the core and the cladding have different refractive index.

11. The light guide according to claim 1, wherein the nanoparticles are homogeneously arranged in the transparent polymer.

12. A lighting device comprising a light guide according to claim 1 and a light source configured to emit light into a light in-coupling portion of the light guide.

13. A method for introducing a local light out-coupling portion in a light guide, the method comprising:
proving a light guide comprising a transparent polymer with nanoparticles arranged therein;
applying a deforming force to at least one portion of the light guide, whereby crazes are induced at, or in vicinity of, at least a portion of the nanoparticles arranged in the at least one portion of the light guide, the crazes are acting as light scatterers forming the local light out-coupling portion in the light guide; and,
wherein said nanoparticles have a size in a range of 5-200 nm ensuring that there is no excess light scattering and,
wherein the light out-coupling is tuned based on a number of crazes induced by a degree the at least one portion is locally deformed.

14. The lighting device comprising a light guide according to claim 1, wherein at least one copolymer includes copolymers of styrene and butadiene.

15. The lighting device comprising a light guide according to claim 1, wherein the deformation force includes one or more of bending, stretching, twisting or compression.

16. The method according to claim 13, further comprising applying different degree of deforming force along different sub-portions of the at least one portion of a light guide, whereby a degree of crazes induced at, or in vicinity of, at least a portion of the nanoparticles arranged in the at least one portion of the light guide is varied as a result of the degree of applied deforming force.

17. The method according to claim 13, further comprising applying the deforming force to a plurality of different portions of the light guide forming a plurality of local light out-coupling portions in the light guide.

* * * * *